Patented June 21, 1949

2,473,548

UNITED STATES PATENT OFFICE 2,473,548

POLYMERIZATION OF VINYLIDENE COMPOUNDS IN AQUEOUS EMULSION IN THE PRESENCE OF IONIZABLE SILVER COMPOUNDS AND AMMONIA

Grant W. Smith, Grand Forks, N. Dak., assignor to The B. F. Goodrich Company, New York, N. Y., a corporation of New York No Drawing. Application October 11, 1947, Serial No. 779,412

6 Claims. (Cl. 260—84)

This invention relates to the polymerization in aqueous emulsion of unsaturated compounds containing the $CH_2=C<$ group, that is, monomeric vinylidene compounds, either alone or in admixture with one another or with other unsaturated materials, and pertains particularly to the use in such polymerization of an activator consisting of a combination of silver ion with ammonia. The invention more specifically relates to the polymerization in aqueous medium, in the presence of such an activator, of mixtures of monomeric materials, each component of which is a monoolefinic vinylidene compound (containing only one carbon to carbon unsaturated bond) such as vinyl chloride, vinylidene chloride, vinyl cyanide (acrylonitrile), vinyl acetate, methyl acrylate, ethyl acrylate, methyl methacrylate, or the like.

It is well known that vinylidene compounds can be polymerized in aqueous emulsion in the presence of catalyzing substances, emulsifying agents, buffers, modifiers and the like, to form polymers predominantly linear in character, and obtained either as stable dispersions or latices or as fine granular solids. It is known, for example, that mixtures of butadiene-1,3 and styrene can be polymerized in aqueous emulsion in the presence of a small quantity of potassium persulfate as a catalyst, a small quantity of dodecyl mercaptan as a polymerization modifier and a small quantity of silver nitrate as activator, to produce a yield of polymer of 40 to 100% in 15 to 18 hours at 40° C. Other known polymerization methods, including those developed for polymerization of mixtures of monoolefinic vinylidene compounds such as mixtures of vinyl chloride and alkyl acrylates, require 24, 40 or even 60 or more hours for completion at this temperature.

It is also known that the polymerizations carried out at lower temperatures of 0 to 35° C. require a longer time for completion but the polymers produced are possessed of properties superior to those produced at 40° C. or above, and that therefore polymerization at lower temperatures, if sufficiently rapid, would be quite desirable. However, the known systems of polymerization catalysis, and the above-described silver nitrate system is no exception, are not as rapid as is desirable for utilization in continuous polymerization, even when relatively high temperatures of 40 to 50° C. are used, and are much too slow for continuous polymerization at the lower temperatures.

I have now discovered that vinylidene compounds in general, and preferably monomeric mixtures of monoethylenic monomers such as vinyl chloride and alkyl acrylates, may be polymerized very rapidly and efficiently at temperatures of as low as 20° C. or lower to obtain high yields of polymers having excellent properties if the polymerization is carrried out in aqueous medium in the presence of small amounts of a polymerization catalyst comprising a peroxygen compound preferably a water-soluble persulfate, and in the additional presence of small amounts of a polymerization activator comprising a complex silver ammonia ion $Ag(NH_3)_2+$ or $Ag(NH_3)_3+$ preferably formed in the aqueous emulsion by addition of a silver salt, such as silver nitrate, and ammonium hydroxide. By the use of the silver ammonium activator yields of polymer of 95 to 100% may be obtained in a much shorter time than with silver ion alone, regardless of the nature of the monomer, and with the preferred monomeric mixtures, in about 30 minutes to about 6 hours, a time short enough to make continuous "pipe-line" polymerizations possible. The "induction period" or time-lag in the commencement of the polymerization reaction may also be sharply reduced or completely eliminated.

When using this activator, the reaction temperature is not critical and may vary widely from as low as 10° C. or lower to as high as 100° C. or higher, though generally, polymerization of the preferred monomeric materials according to this invention is effected at 20° to 60° C. in 1 to 2 hours or less.

The amount of peroxygen catalyst necessary in order to obtain rapid polymerization in the method of this invention is likewise not critical but may vary from 0.1% to 0.5% or 1% or even as high as 5% (based on the monomers) but, generally, the use of 0.2 to 0.7% of a water-soluble persulfate such as ammonium, sodium or potassium persulfate is preferred. Other well known peroxygen compounds such as hydrogen peroxide, benzoylperoxide, alkali metal perborates, and percarbonates and the like may be substituted for the persulfates but the persulfates give far better results and are greatly preferred.

The speed of the polymerization reaction varies in accordance with the amount of ionizable silver salt added to the reaction mixture but rate increases with an increase in added silver salt. For example, as little as 0.0005% of silver nitrate (on the water phase) will produce a definite accelerating effect on the copolymerization of a mixture containing 90% by weight of vinyl chloride and 10% by weight of ethyl acrylate, and the accelerating effect rapidly increases as the amount of silver nitrate is increased to 0.02% but the effect decreases with higher silver nitrate concentrations. Similar results are shown in the polymerization of other monomers and as a general rule concentrations of 0.01 to 0.10% silver nitrate on the water phase will be found to produce fastest reaction but amounts varying from 0.0005 to 0.5% may be used to advantage.

The amount of ammonia ($NH_3$) necessary in conjunction with the silver nitrate to obtain rapid polymerization is not critical but the presence of some ammonia so as to form silver ammonium ion is necessary. For example, the polymerization of vinyl chloride alone does not proceed at 40° C. after more than 48 hours in the presence of silver nitrate and absence of ammonia but as little as 0.05 to 0.10% ammonia has such a pronounced effect on the activity of the silver activator that yields of 77% of polyvinyl chloride may be obtained in 2 hours at 40° C. Generally, the addition of 0.05 to 1% of ammonia (based on the aqueous phase) is sufficient to convert the silver to silver ammonium ion and to complete polymerization of the preferred monomeric materials in from 0.5 to 1.5 hours at temperatures of 20 to 60° C.

The above concentrations are based on the addition of silver nitrate and ammonia, either as such or as ammonium hydroxide, to the aqueous medium either before or after addition of the material to be polymerized. This however is not the only method of producing complex silver ammonia ions in the polymerization mixture since such ions are formed by adding other water-soluble or sparingly soluble silver compounds such as silver sulfate, silver acetate, silver nitrite, silver fluoride, silver chlorate or silver lactate to the reaction mixture together with ammonia or ammonium hydroxide. Even metallic silver and insoluble silver compounds such as the chloride, bromide and carbonate may be used since in presence of ammonia enough of the silver ammonia complex ions will be formed to accelerate the polymerization. In addition the silver ammonia ions may be formed outside the reaction medium and added as such thereto, for example, by adding diamino silver chloride, $Ag(NH_3)_xCl$, fromed by dissolving silver chloride in ammonium hydroxide. In all these alternative methods the concentration of silver which should be used is that which is chemically equivalent to the amounts of silver nitrate set forth above.

Polymerization of monomeric material according to the method of this invention may be performed in an aqueous medium in the presence of an efficient emulsifying agent so as to obtain the polymer in the form of a latex or dispersion. Examples of emulsifying agents which may be used include the fatty acid soaps such as sodium oleate, potassium palmitate, sodium stearate, sodium myristate and the like; and the synthetic saponaceous materials such as the hymolal sulfates and alkaryl sulfonates including, for example, sodium lauryl sulfate, sodium isopropyl naphthalene sulfonate, and the sodium salts of alkyl naphthalene or benzene sulfonic acids; the sodium salt of N-octadecyl, N - 1,2 - dicarboxyethyl sulfosuccinamate, and others. Gelatin, fine bentonite clay, and other colloidal protective materials may also be used. The nature of the emulsifying agent is not critical for in any case stable dispersions of polymer are obtained by the use of the silver-ammonia activator of this invention in an aqueous medium in the presence of an emulsifying agent.

Alternatively, polymerization of the monomeric material in the presence of the silver-ammonia activator of this invention may be effected in an aqueous medium in the absence of any added emulsifying agent. In the absence of an emulsifier polymerization proceeds smoothly and rapidly to high yields and the polymer is usually obtained in a granular condition which facilitates separation of the polymer from the aqueous phase.

In either event (whether emulsifier is present or absent) it is preferred that the amount of water present be 1 to 5 times that of the monomeric material and that the reaction mixture be agtitated constantly during the time that polymerization is taking place so as to insure efficient distribution of the monomeric material throughout the aqueous phase.

The polymerization is preferably carried out in the absence of gaseous oxygen for it has been observed that the presence of even a small amount of molecular oxygen will cause an appreciable "induction period" or lag in the commencement of polymerization. Accordingly, it is preferred that the monomeric materials be freshly distilled shortly before use or stored under an inert atmosphere in order to prevent absorption of oxygen. It is also preferred, if a closed reactor is used, that the reactor be evacuated and/or supplied with an inert atmosphere such as nitrogen before charging the reaction mixture. If polymerization is effected continuously in a "pipe line" appropriate precautions are preferably taken to exclude oxygen from the reaction mixture.

The new catalyst-activator combination of this invention may be employed in conjunction with various other polymerization expedients. For example, in polymerizations involving vinyl chloride buffer salts such as sodium bicarbonate may be added to the reaction mixture and in polymerization of dienes to form synthetic rubber polymerization modifiers such as the alkyl mercaptans may be added. As other expedients, the entire mixture of monomers is not added to the reaction mixture at the start of the polymerization but is added in increments or at a uniform rate over the entire reaction period or one or more of the more readily polymerizable monomers added in increments or at a uniform rate over the reaction period. Moreover, the catalyst or silver-ammonia activator may be added gradually or in small increments during the progress of the polymerization. Addition of activator gradually may be effected by coating the added silver or silver compound with collodion or suspending it on silica gel carrier so as to permit gradual diffusion of silver and formation of silver ammonia complex during the course of the reaction.

The method of this invention is applicable generally to the polymerization of unsaturated compounds containing the $CH_2=C<$ group, that is, vinylidene compounds or compounds containing a terminal methylene group attached by a double bond to a carbon atom. Examples of such componuds include vinylidene compounds containing only one carbon to carbon unsaturated bond such as vinyl chloride, vinylidene chloride, styrene, p-chlorostyrene, 3,5 - dichlorostyrene, p - methoxy styrene, acrylonitrile, methacrylonitrile, alpha-chloro acrylonitrile, methyl acrylate, ethyl acrylate, methyl methacrylate, butyl ethacrylate, methacrylamide, vinyl methyl ketone, vinyl pyridine, vinyl carbazole, vinyl methyl ether, vinyl acetate, vinyl benzoate, isobutylene, ethylene and other similar monoolefinic polymerizable compounds. Other vinylidene compounds containing more than one unsaturated linkage include the conjugated dienes such as butadiene-1,3, isoprene, and the other butadiene-1,3, hydrocarbons, chloroprene and 3-cyano butadiene-1,3, as well as trienes such as myrcene and compounds containing olefinic and acetylenic bonds such as vinyl acetylene, vinyl ethynyl diethyl carbinol and the like. The above vinylidene compounds may be copolymerize1 with one another or with still other unsaturated polymerizable materials such as diethyl maleate, diethyl fumarate, maleic acid or anhydride or the like.

It will be understood from the above examples that vinyl compounds are a sub-genus of vinylidene compounds since they contain the characteristic $CH_2=C<$ structure, one of the valences being connected to hydrogen to form the vinyl

group.

The activator of this invention is particularly applicable to the polymerization of mixtures of monomeric materials each component of which is a vinylidene compound containing only one carbon to carbon unsaturated linkage, and especially to mixtures of monomers each of which is a compound of the structure

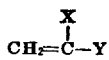

wherein X represents hydrogen, halogen, methyl, cyano, carbalkoxy or acyloxy and Y represents halogen, carbalkoxy, or acyloxy. Illustrative examples of compounds represented by the above general structure are vinyl chloride, vinyl bromide, vinyl fluoride, vinyl iodide, vinyl acetate, vinyl propionate, vinyl butyrate, vinyl benzoate, vinylidene chloride, vinylidene bromide, methyl acrylate, ethyl acrylate, methyl methacrylate, methyl ethacrylate, butyl ethacrylate, acrylonitrile, methacrylonitrile, methyl alpha-cyano acrylate, ethyl alpha-chloro acrylate, and others.

The invention will be further described by the following specific examples which are intended to be merely illustrative of the invention and not a limitation thereon.

EXAMPLE 1

To illustrate the effect of the silver-ammonia activator on a persulfate catalyzed polymerization reaction, emulsions containing the following materials were prepared and then agitated at 50° C. to bring about polymerization of the monomeric materials present.

| | Parts |
|---|---|
| Vinyl chloride | 90 |
| Ethyl acrylate | 10 |
| Potassium persulfate | 0.5 |
| Emulsifier[1] | 3.0 |
| Ammonia | 0.15 |
| Silver nitrate | 0.0075 |
| Water | 147.0 |

[1] Sodium salt of N-octadecyl-N-1,2-dicarboxyethyl sulfosuccinamate.

Within 48 minutes, the temperature inside the reaction vessel rose to 63.5° C. and the pressure to 140 lbs./sq. in. In 65 minutes, the pressure was falling very rapidly, so the reaction was considered complete. A latex of 39.7% total solids content was obtained which was possessed of good stability and a particle size of about 1000 Å.

EXAMPLES 2 AND 3

To illustrate the effect of ammonia on the activity of the silver activating compound, emulsions containing the following materials were prepared and agitated at 35° C. to bring about polymerization of the monomers:

| | Parts |
|---|---|
| Vinyl chloride | 90 |
| Ethyl acrylate | 10 |
| Potassium persulfate | 0.5 |
| Emulsifier[2] | 4.0 |
| Ammonia | Variable |
| Silver nitrate | 0.01 |
| Water | 196.0 |

[2] Same as in Example 1.

In a control, polymerization of an emulsion containing no ammonia produced no observable reaction in 47 hours. But in Example 2, polymerization of an emulsion containing only 0.05% $NH_3$ exhibited an induction period of only 45 minutes after which reaction proceeded smoothly to a yield of 90% in 4.3 hours. In Example 3, polymerization of an emulsion containing the materials in the above proportions except for 0.10% ammonia, resulted in an induction period of only 25 minutes and a yield of 92% in 1.8 hours. It is noted that the induction period was shortened by the presence of only 0.10% ammonia from 47 hours or more to 25 minutes and at the same time a remarkable increase in reaction rate was obtained.

EXAMPLES 4 TO 9

To demonstrate the effect of reaction temperature and concentration of silver nitrate on the speed of reaction, emulsions were prepared in the following proportions, in which parts are by weight:

| | |
|---|---|
| Vinyl chloride | 90 |
| Ethyl acrylate | 10 |
| Potassium persulfate | 0.5 |
| Emulsifier[3] | 3.0 |
| Ammonia | 0.15 |
| Water | 103.00 |
| Silver nitrate | Variable |
| Temperature | Variable |

[3] Same as in Example 1.

The amounts of silver nitrate used were respectively .003%, 0.005%, 0.010% and 0.020% on the water phase. The temperatures used were 40° C., 35° C., and 25° C. In all cases latices of about 50% total solids content were prepared. Table I below presents the data obtained in each reaction.

Table I

| Example | Per cent $AgNO_3$ | Bath Temperature | Time to Completion of Reaction | Induction Period |
|---|---|---|---|---|
| | | °C. | | Hours |
| 4 (control) | None | 40 | No reaction in 48 hrs. | 48 |
| 5 | .003 | 40 | 467 min | None |
| 6 | .005 | 40 | 290 min | None |
| 7 | .010 | 40 | 47 min | None |
| 8 | .020 | 35 | 45 min | None |
| 9 | .020 | 25 | 72 min | None |

It is to be noted that in the case of Example 4 (control), which contained no silver nitrate activator, no polymerization occurs at 40° C. (reaction does not occur in a reasonable time in this system in the presence of potassium persulfate at temperatures less than 45° C.) but in Example 5 where the polymerization mixture contained only .003% silver nitrate the reaction started with no observable induction period and was complete in 467 minutes. It is to be further noted that with 0.010% of silver nitrate (Example 7) present in the polymerization mixture, the reaction was complete in 47 minutes at 40° C. It is to be specially noted that complete reaction could be obtained in 72 minutes at 25° C. (Example 9) in the presence of only 0.020% silver nitrate.

EXAMPLES 10 TO 13

Vinyl chloride was polymerized in an aqueous medium, by agitating the following mixture of materials:

| | Grams |
|---|---|
| Vinyl chloride | 4.0 |
| Potassium persulfate | 0.04 |
| Ammonia (0.1% on aqueous phase) | 0.008 |
| Water (boiled and distilled) | 8 |
| Silver nitrate | Variable |

The amounts of silver nitrate used were none, 0.0008 gm. and 0.0016 gm. The reaction mixtures were placed in small pyrex glass tubes and tumbled end-over-end at 15 R. P. M. In all cases (except the control) the polymer was obtained in an extremely finely-divided state with some large pieces of polymer. Table II presents the time-temperature and yield data and the amounts of silver nitrate used.

Table II

| Example | Wt. AgNO₃ | Temperature | Time Induction Period | Time Total Reaction Time | Yield |
|---|---|---|---|---|---|
| | Grams | °C. | Minutes | Minutes | Per cent |
| 10 | none | 40 | 122 | 242 | 10 |
| 11 | .0008 | 40 | 1 | 121 | 77 |
| 12 | .0016 | 35 | None | 240 | 86 |
| 13 | .0016 | 40 | None | 240 | 90 |

EXAMPLES 14 TO 23

The method of this invention is also applicable to the polymerization of monomeric mixtures containing a diene-type hydrocarbon. Emulsions were prepared according to the following proportions, in which parts are by weight:

| | |
|---|---|
| Monomers (to total) | 10 |
| Potassium persulfate | 0.05 |
| Emulsifier (soap flakes) | 0.5 |
| Ammonia | 0.0375 |
| Water | 25 |
| Silver nitrate | Variable |

The emulsions were enclosed in glass tubes, the tubes swept out with nitrogen and sealed. The tubes were placed in a constant temperature bath at 40° C. and rotated end-over-end at 15 R. P. M. Table III presents the composition of the monomeric mixture, the amount of silver nitrate present, the length of the induction period (time to start of reaction), and the time at which reaction was complete and the yield obtained.

Table III

| Example | Vinylidene Chloride | Butadiene-1,3 | Acrylonitrile | Styrene | Methyl Acrylate | Parts Silver Nitrate | Induction Period | Total time of Reaction | Yield |
|---|---|---|---|---|---|---|---|---|---|
| | | | | | | | | Hours | Percent |
| 14 | | 7.5 | | 2.5 | | None | 27 hrs | 118 | 89 |
| 15 | | 7.5 | | 2.5 | | 0.0025 | 3 hrs | 49 | 99.9 |
| 16 | | 7.5 | | 2.5 | 0.5 | None | 7½+ hrs | 74¼ | 87 |
| 17 | | 7.5 | | 2.5 | 0.5 | 0.0025 | 6— hrs | 74¼ | 95 |
| 18 | | 5.5 | 4.5 | | | None | 3 hrs | 118 | 85 |
| 19 | | 5.5 | 4.5 | | | 0.0025 | 80 min | 118 | 94 |
| 20 | | 5.5 | 4.5 | | 0.5 | None | 7½+ hrs | 74¼ | 90 |
| 21 | | 5.5 | 4.5 | | 0.5 | 0.0025 | 1 hr | 23 | 98 |
| 22 | 5.0 | 5.0 | | | 0.5 | None | 7¼+ hrs | 74¼ | 92 |
| 23 | 5.0 | 5.0 | | | 0.5 | 0.0025 | 6— hrs | 74¼ | 94 |

EXAMPLES 24 TO 43

The silver-ammonia ion is effective in acceleraating the polymerization of other monomeric mixtures in addition to those of the foregoing examples. In the following examples mixtures of materials were prepared in the following proportions, in which parts are by weight:

| | |
|---|---|
| Monomers (variable) | 100 |
| Potassium persulfate | 0.5 |
| Emulsifier[4] | 0.5 |
| Ammonia | 0.2 |
| Water | 196.0 |
| AgNO₃ | Variable |

[1] Same as in Example 1.

The materials were sealed in glass tubes and the tubes were rotated end-over-end in a water bath maintained at 45° C. Table IV presents data showing the monomer combination used, the amount of silver nitrate used, and the time to the start of the reaction.

Table IV

| Example | Vinyl Chloride | Vinylidene Chloride | Acrylonitrile | Vinyl Acetate | Diethyl Maleate | Styrene | Per Cent Silver Nitrate | Time to Start of Reaction |
|---|---|---|---|---|---|---|---|---|
| | | Grams | | | | | | |
| 24 | 80.0 | 20.0 | | | | | | 28¾ hrs. |
| 25 | 80.0 | 20.0 | | | | | 0.02 | ¾ hr. |
| 26 | 80.0 | | 20.0 | | | | | No reaction in 31⁵⁄₁₂ hrs. |
| 27 | 80.0 | | 20.0 | | | | 0.02 | ¾ hr. |
| 28 | 80.0 | | | 20.0 | | | | 23¼ hrs. |
| 29 | 80.0 | | | 20.0 | | | 0.02 | ¾ hr. |
| 30 | 80.0 | | | | 20.0 | | | 23¼ hrs. |
| 31 | 80.0 | | | | 20.0 | | 0.02 | 1 hour. |
| 32 | 80.0 | | | | | 20.0 | | 23¼ hrs. |
| 33 | 80.0 | | | | | 20.0 | 0.02 | ¾ hr. |
| 34 | 20.0 | 80.0 | | | | | | 23 hrs. |
| 35 | 20.0 | 80.0 | | | | | 0.02 | ¼ hr. |
| 36 | | 80.0 | 20.0 | | | | | 7½ hrs. |
| 37 | | 80.0 | 20.0 | | | | 0.02 | ¼ hr. (Yield 96% in 7½ hrs.). |
| 38 | | 80.0 | | 20.0 | | | | 4¼ hrs. |
| 39 | | 80.0 | | 20.0 | | | 0.02 | ¼ hr. (Yield 99% in 23 hrs.). |
| 40 | | 80.0 | | | 20.0 | | | 7¼ hrs. |
| 41 | | 80.0 | | | 20.0 | | 0.02 | ¼ hr. |
| 42 | | 80.0 | | | | 20.0 | | 23 hrs. |
| 43 | | 80.0 | | | | 20.0 | 0.02 | ¼ hr. |

It is to be noted that in all cases, the presence of both silver nitrate and ammonia reduced the "induction period" or time to the start of the reaction from 23¼–31 1/2 hrs. to less than 1 hour and that in most cases the induction period in the presence of both silver nitrate and ammonia was only ¼ to ¾ of an hour. Thus, the total time of reaction in the presence of the silver-ammonia activator of this invention is much less than in the presence of potassium persulfate alone.

It is to be noted in the above examples that in every case the presence of silver nitrate improved the polymerization rate; in most cases it reduced the over-all reaction time to ⅓ or ½ that required when no silver nitrate was present. Similar improvements are secured in the polymerization of the other vinylidene compounds mentioned hereinabove.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

I claim:

1. The method which comprises polymerizing a monomeric vinylidene compound in an aqueous medium comprising silver ammonia complex ion and a peroxygen compound and in the absence of substantial amounts of gaseous oxygen.

2. The method which comprises polymerizing a monomeric vinylidene compound in an aqueous medium comprising silver nitrate, ammonium hydroxide and a peroxygen compound and in the absence of substantial amounts of gaseous oxygen.

3. The method which comprises polymerizing a monomeric mixture each component of which is a vinylidene compound containing only one carbon to carbon unsaturated linkage in an aqueous medium comprising silver ammonia complex ion and a peroxygen compound and in the absence of substantial amounts of gaseous oxygen.

4. The method which comprises polymerizing a monomeric material comprising vinyl chloride in an aqueous medium comprising silver nitrate, ammonium hydroxide and a peroxygen compound and in the absence of substantial amounts of gaseous oxygen.

5. The method which comprises polymerizing a monomeric material comprising vinyl chloride and and alkyl acrylate in an aqueous medium comprising silver nitrate, ammonium hydroxide, and potassium persulfate and in the absence of substantial amounts of gaseous oxygen.

6. The method which comprises polymerizing vinyl chloride in an aqueous medium comprising silver nitrate, ammonium hydroxide and potassium persulfate and in the absence of substantial amounts of gaseous oxygen.

GRANT W. SMITH.

REFERENCES CITED

The following references are of record in the file of this patent:

UNITED STATES PATENTS

| Number | Name | Date |
|---|---|---|
| 2,419,090 | Rainard | Apr. 15, 1947 |